United States Patent Office 3,146,132
Patented Aug. 25, 1964

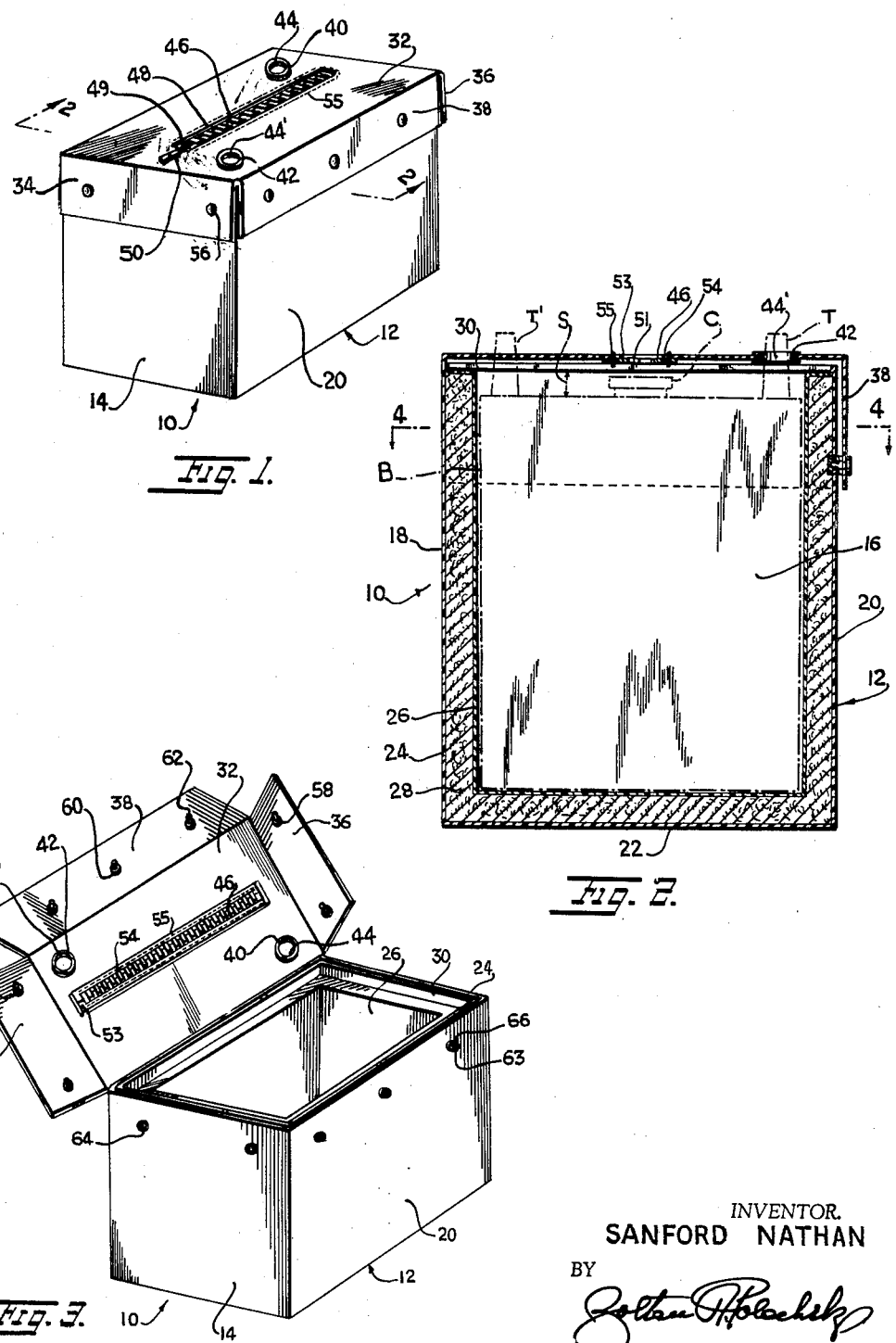

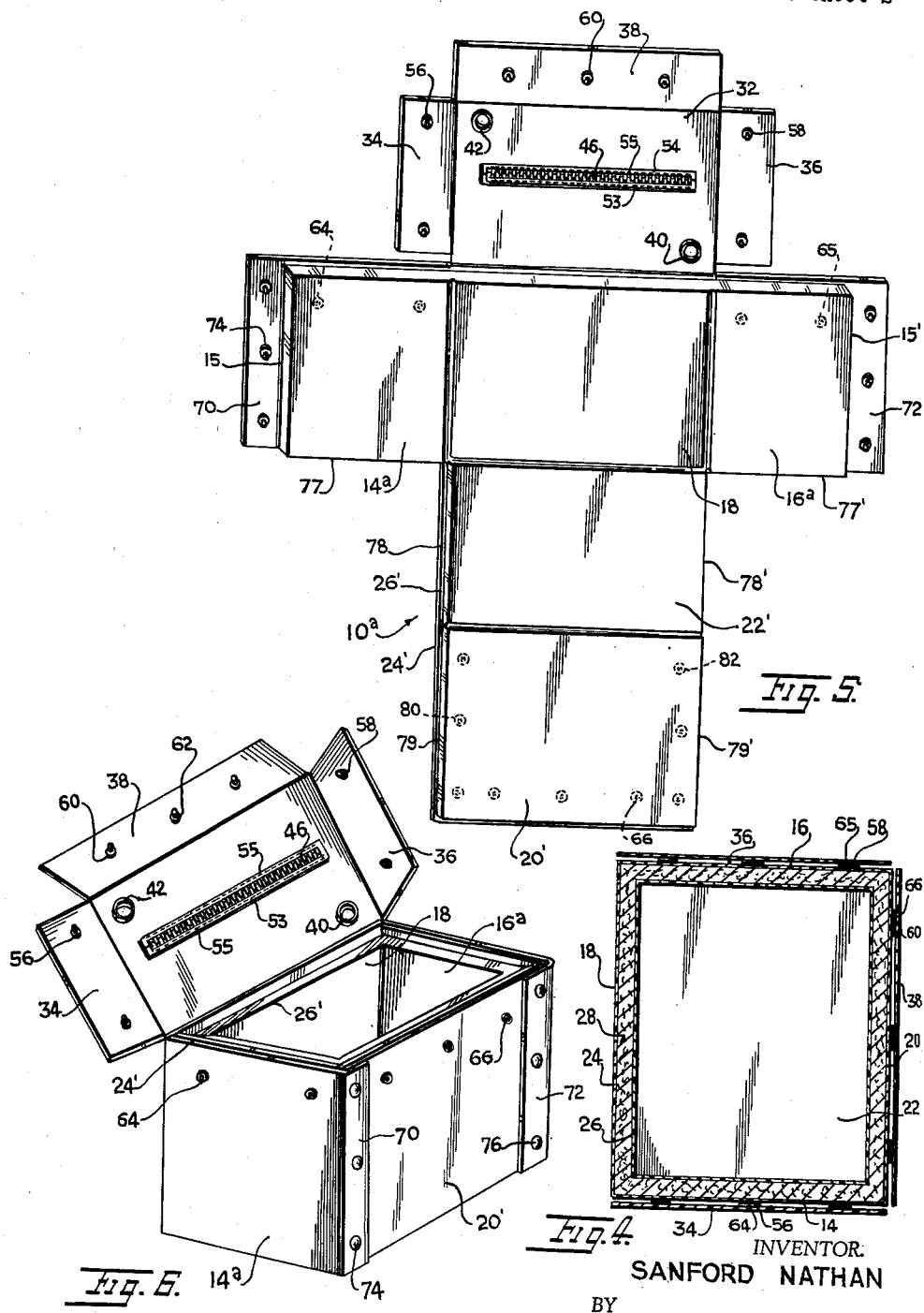

3,146,132
BATTERY CLIMATIZER COVER
Sanford Nathan, 1084 Gerard Ave., Bronx, N.Y.
Filed Dec. 7, 1961, Ser. No. 157,664
1 Claim. (Cl. 136—166)

This invention concerns a thermally insulated battery cover.

The invention is adapted to protect a battery employed in a vehicle from freezing in winter and from excessive heat of the engine of the vehicle, produced in summer.

It is a principal object of the invention to provide a removable cover or casing in which the battery can be enclosed, the walls of the casing being thermally insulated, with a lid on the casing having a slide fastener closure providing access to the battery and having eyelet openings through which terminals of the battery extend.

Another object is to provide a cover or casing as described wherein the lid is provided with flaps having snap fastener members quickly attachable to and detachable from mating fastener members on the walls of the casing.

A further object is to provide a cover or casing as described wherein the cover or casing is formed as a flat body structure to facilitate shipment and storage and to facilitate installation of the battery in the casing.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

FIG. 1 is a perspective view of a battery cover or casing embodying the invention, with lid closed.

FIG. 2 is a vertical sectional view on an enlarged scale taken on line 2—2 of FIG. 1.

FIG. 3 is a perspective view of the battery cover with lid opened.

FIG. 4 is a horizontal sectional view on a reduced scale taken on line 4—4 of FIG. 2.

FIG. 5 is an oblique plan view of another battery cover in open position, according to the invention.

FIG. 6 is a perspective view similar to FIG. 3, showing the battery cover of FIG. 5 with base closed and lid open.

Referring to FIGS. 1–4, there is shown battery cover 10 having a rectangular box-like base 12 with open top. The base has vertical end walls 14, 16, a vertical rear wall 18, a vertical front wall 20 and horizontal bottom wall 22. The several walls are formed as laminated structures with an outer plastic shell 24 and an inner plastic shell 26 spaced apart on opposite sides of a thermally insulated filler 28 preferably made of Fiberglas, rock wool, asbestos fiber or the like.

The shells 24 and 26 are preferably made of synthetic resin material. The shells are fused together at the open top of the base forming a closed rectangular seam 30. The outer shell 24 is extended upwardly beyond the rear wall to form an integral rectangular lid 32 having rectangular flaps 34, 36 extending outwardly at ends of the lid and another rectangular flap 38 at the front edge of the lid.

At diagonally opposite corners of the lid are two large eyelets 40, 42 having openings 44, 44' through which may extend terminal posts T, T' of a battery B as indicated in dotted lines in FIG. 2. A slide fastener 46 is secured at an elongated rectangular opening 48 formed in the center of the lid and extending parallel to its front and rear edges. This slide fastener has an operating slide 49 and handle 50 which can be operated to engage and disengage the teeth 51 of the slide fastener. This provides access to filter caps C and other parts of the battery. The tapes 53, 54 of the slide fastener are secured by stitching 55 to the underside of the lid at the rim of opening 48. Male snap fastener members 56, 58, 60 are secured to the inner sides of flaps 34, 36, 38. These members have studs 62 adapted to engage in holes 63 of female snap fastener members 64–66 secured to outer sides of the end and front walls 14, 16, 20.

FIGS. 1, 2 and 4 show the lid of the cover 10 closed. When the lid is closed, the battery B is protected from external heat and cold by the thick insulated front, rear, end, and bottom walls of the cover. In addition, a substantially dead air space S is defined between the top of the battery and underside of lid 32 which provides thermal insulation. The snap fastener arrangement permits the lid to quickly be opened as shown in FIG. 3, providing access to the interior of the cover for removing or inserting the battery or for servicing the battery. Normally, when the lid is closed connecting cables will be attached to the battery terminals. These cables can be detached and attached without disturbing the battery cover.

FIGS. 5 and 6 show another battery cover 10$^a$ which is formed with a flat body structure. Parts corresponding to those of battery cover 10 are identically numbered. It will be noted that inner ends of end walls 14$^a$ and 16$^a$ are integral with ends of rear wall 18 while outer ends 15, 15' of walls 14$^a$ and 16$^a$ have flaps 70, 72 provided with male snap fastener members 74, 76. The bottom edges 77, 77' of the end walls are free from opposite ends 78, 78' of the bottom wall 22'. Also, opposite ends 79, 79' of front wall 20' are free from the outer ends 15, 15' of end walls 14$^a$, 14$^b$. The inner shell 26' is fused to outer shell 24' at edges of the walls 14$^a$, 16$^a$, 20', 22'.

Vertically spaced female snap fastener members 80, 82 are provided near opposite ends of the front wall 20' for engaging the male snap fastener members 74, 76. The flat body structure of the cover in open position as shown in FIG. 5, permits a plurality of such covers to be stacked in a minimum space for shipment and storage. Also, the flat structure facilitates installation of a battery in the cover. The battery can be placed upon the bottom wall 22' and the remainder of the cover can then be wrapped around the battery and secured by engaging the several snap fasteners on front and end walls. The battery cover 10 by contrast requires that the battery be lifted and inserted into the open top of the base. For removal, the cover 10$^a$ can be unwrapped from the battery which then can be moved horizontally off the cover or the smooth cover can be pulled out from under the battery without lifting the battery. The cover 10, by contrast, requires that the battery be lifted up out of the base before the cover can be removed.

The structures of both covers 10 and 10$^a$ employ plastic inner and outer shells for the end, front, rear and bottom walls with thermal insulation in between the shells. The lid is a part of the outer shell. The shell material is moisture-proof, acid resistant, chemically stable and resistant to abrasion and wear. Use of covers as described will extend the useful lives of batteries. The covers will prevent freezing of batteries in winter so that full battery power is available for engine starting. The covers will insulate the batteries from excessive engine heat in summer and will thus prevent deterioration of the batteries.

While I have illustrated and described the preferred embodiments of my invention, it is to be understood that I do not limit myself to the precise constructions herein disclosed and that various changes and modifications may be made within the scope of the invention as defined in the appended claim.

Having thus described my invention, what I claim as new, and desire to secure by United States Letters Patent is:

A battery cover, comprising a flat foldable body formed of three integral rectangular hinged sections, said body being formed as a laminated structure with inner and outer spaced sheet members and having a relatively thick filling of thermally insulating fibrous material disposed therebetween, said outer sheet member extending beyond said inner sheet member and said filling to define a peripheral flange about each section, the outer sheet member of one of said sections having two rectangular extensions at its opposite end, snap fastener members on the outer side of another of said sections, other snap fastener members on the inner side of said two extensions engageable with the first-named snap fastener members to form said body into a rectangular open top box-like base with bottom, end, front and rear walls, the outer sheet member of said one section having another rectangular extension foldable to define a lid for said base, said other rectangular extension having an elongated central opening, said other extension having rectangular flaps with further snap fastener members on inner sides thereof extending from each of its three free sides, and a plurality of other snap fastener members on outer sides of said two rectangular extensions and said other section engageable by said further snap fastener members to hold said lid closed over said base, said other rectangular extension of said outer sheet having eyelets at diagonally opposite corners thereof for protrusion of terminals of said battery therethrough, and a slide fastener secured at the elongated opening centrally located in said other rectangular extension of said outer sheet to provide access to centrally located filler caps at the top of the battery when the lid is closed.

References Cited in the file of this patent

UNITED STATES PATENTS

| | | |
|---|---|---|
| 1,557,382 | Sundback | Oct. 13, 1925 |
| 1,779,207 | Candar | Oct. 21, 1930 |
| 2,096,376 | Lauppe | Oct. 19, 1937 |
| 2,666,091 | Martin et al. | Jan. 12, 1954 |

FOREIGN PATENTS

| | | |
|---|---|---|
| 518,129 | Canada | Nov. 8, 1955 |
| 117,169 | Sweden | Sept. 10, 1946 |

OTHER REFERENCES

"The Hookless Fastener," published by the Hookless Fastener Co., Meadville, Pa., 1927.